Feb. 19, 1952 G. CORALLO 2,586,208
METHOD OF MAKING STITCHLESS EMBOSSED FABRICS
Filed Dec. 6, 1949

INVENTOR.
Gaetano Corallo;
BY
R. S. Burr
Attorney.

Patented Feb. 19, 1952

2,586,208

UNITED STATES PATENT OFFICE 2,586,208

METHOD OF MAKING STITCHLESS EMBOSSED FABRICS

Gaetano Corallo, Los Angeles, Calif.

Application December 6, 1949, Serial No. 131,393

5 Claims. (Cl. 154—106)

1

This invention has for its primary purpose the provision of a stitchless embossed fabric which may be readily and inexpensively produced under a novel method, with a bas-relief or embossed effect in any desired pattern or design and which is characterized by a flexible, soft cushioning quality and appearance similar to that of a quilted fabric minus the usual stitching.

The present invention may further be qualified as providing a stitchless "quilted" or padded fabric inasmuch as in carrying out the method hereof, a face sheet of fabric and a backing sheet therefor are united in such manner as to form therebetween without stitching, a plurality of closed pockets representing a desired pattern or design, after which a soft filler material is injected into the pockets to raise or emboss the face sheet in the shape of the pockets and complete the fabric product thereof.

A particular object is to provide a mode of fashioning the padded fabric by cementing a face sheet to a backing sheet by means of an adhesive applied along a defined pattern constituting margins of a series of closed pockets and then injecting a filler material into such pockets; the adhesive serving as a means whereby the face sheet and backing sheet will be securely held together around the margins of the padded pockets without stitching as heretofore commonly employed.

With the foregoing objects in view together with such other objects and advantages as may subsequently appear, the invention resides in the steps hereinafter described and claimed, and illustrated by way of example in the accompanying drawing in which:

Figure 5:
Fig. 5 is a view of the face of the finished fabric with portions broken away.
Figure 6:
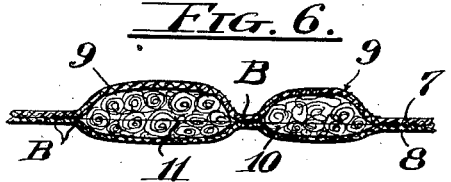
Fig. 6 is an enlarged sectional view taken on the line 6—6 of Fig. 5.

An embossed piece of fabric made in accordance with this invention is shown in Figs. 5 and 6 and embodies a face sheet 7 and a backing sheet 8. The face sheet 7 may consist of any suitable flexible fabric such as a cloth formed of cotton, linen, silk or other fibrous materials, and may consist of damask, cretonne and the like. The backing sheet may consist of a fabric such as muslin, or other similar flexible and comparatively coarse woven material, but may also consist of other flexible sheet material such as paper, sheet plastic and the like. The embossing, generally designated 9, is made up of a series of closed pockets 10 formed by and between the sheets 7 and 8 in the desired pattern or design and each pocket is filled with a soft cotton yarn or like thread filler 11 which raises the pockets and creates the desired embossed or bas-relief effect.

A liquid adhesive having the quality of being applied to cloth or like porous fabric and quickly drying and forming a gummy and tacky layer thereon without penetrating the fabric, is used to adhere the face sheet and backing sheet together along a defined open pattern to form the contoured pockets 10. It is desirable that an adhesive be employed that will not be immediately dissolved or softened on contact with a water or hydrocarbon so that the embossed fabric product may be subjected to sponging with water or dry cleaned with a hydrocarbon without detriment to the cemented joints formed by the adhesive. It has been found that a synthetic adhesive derived from a polyvinyl or compounded from several polyvinyls is highly satisfactory and meets the above recited requirements. Several adhesives of this nature are presently on the market.

Figure 1:
Fig. 1 is a plan view of the back of the face sheet of fabric to be embossed and produced in accordance with this invention showing one way of applying an adhesive substance thereto in any desired pattern or design, this being the first step in carrying out the method hereof.
Figure 2:
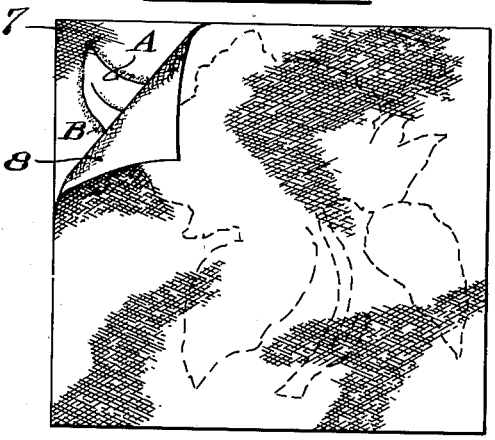
Fig. 2 is a view similar to Fig. 1 showing how the backing sheet of fabric is placed over the back of the face sheet for adhering the sheets together to form closed pockets therebetween forming the desired embossing design.
Figure 3:
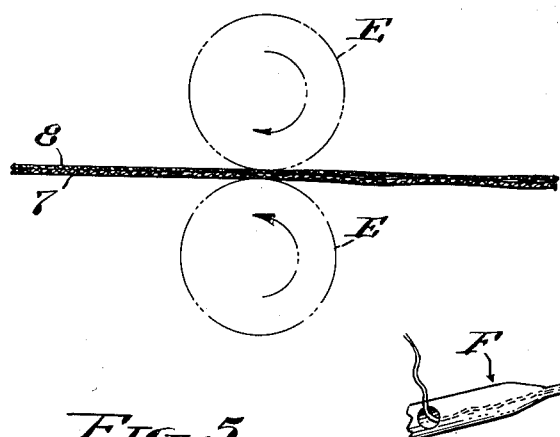
Fig. 3 is a sectional schematic view showing one method of pressing the face and backing sheets between rollers in effecting their adherence to each other.

In carrying out the invention the face sheet 7 has a design delineated or imprinted thereon in a fashion to appear on the back thereof, as indicated by the solid lines A in Fig. 1. In one method of making the fabric according to this invention, the adhesive B indicated by the dotted lines in Fig. 1 is applied on the back of the face sheet 7 with a suitable tool D so as to follow the pattern lines A after which the backing sheet 8 is applied to the back of the face sheet 7 to overlie the latter as shown in Fig. 2. The adhering portions of the sheets 7 and 8 which form the pockets 10 are indicated by the double broken lines C in Fig. 4. The two sheets are then pressed together evenly so as to cause them to adhere one to the other through the adhesive lines B and form the desired series of closed pockets 10. This may be accomplished as shown in Fig. 3 by pressing the sheets 7 and 8 between rollers E which if need be are heated so as to subject the adhesive to both heat and pressure. Any other conventional means of applying heat and pressure may be employed.

Figure 4:
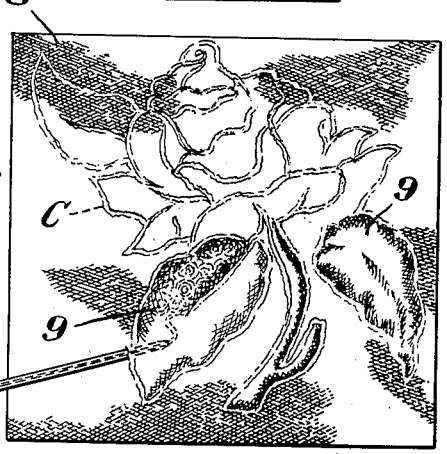
Fig. 4 is a bottom plan view of the fabric showing how a soft filler material is injected into the pockets through the backing sheet with a hollow needle to emboss a design on the face sheet.

Having formed the pockets 10 the next step is to fill them with a soft filler material such as the cotton yarn or the like filler 11 so as to raise the face sheet 7 and produce the embossing 9 in the shape of the defined pockets. One method of filling or stuffing the pockets 10 consists in injecting the filler under air pressure through a hollow needle F as indicated in Fig. 4 which needle is inserted through the backing sheet 8 into the pockets 10. This needle injection apparatus and operation is well known in the art of quilting but has not heretofore been employed as far as applicant is aware in connection with pockets formed between a face sheet and a backing sheet without stitching as contemplated by the present method.

It will now be apparent that under the present invention there is provided a novel and highly ornamental and useful decorative fabric which may be made with silks, satins, and various other type of fabrics of the character used in covering furniture, making drapes, curtains, bed spreads, and various other decorative fabric constructions.

It is important to note that as the adhesive used to form pockets in place of the usual stitching does not penetrate the face sheet of the fabric nor in any manner indicate its presence on the back of the face sheet, there is produced a most novel and decorative embossed fabric which is padded or has a quilted effect without stitching. Moreover the adhesive will be substantially permanent as a pocket forming medium and will withstand dry cleaning and other cleaning methods.

The fabric of this invention may have the pockets formed throughout the area thereof and thus become a generally "padded" fabric or it may have but a single design pocket or a group of pockets formed at any desired point on a fabric unit of given area in which case it is padded or "puffed out" only where the pocket or pockets are located.

While I have shown and described a specific embodiment of my invention, I do not limit myself to the exact details of construction set forth, the invention embraces such changes, modifications and equivalents of the parts and their formation and arrangement as come within the purview of the appended claims.

I claim:

1. The method of making a stitchless embossed fabric which includes applying an adhesive to the back of a face sheet so as to form a pocket when a backing sheet is adhered to said face sheet, adhering a backing sheet to said face sheet by means of said adhesive to form such a closed pocket, then injecting under air pressure through one of the sheets into the pocket a filler of soft material.

2. The method of making an embossed stitchless fabric which includes the step of applying an adhesive along spaced lines on one side of a flexible fabric face sheet, applying to said one side of the face sheet a flexible backing sheet so as to adhere said sheet one to the other along said spaced lines, and then injecting under air pressure a filler through one of the sheets into the space between the lines where said sheets are adhered one to the other.

3. The method of making an embossed fabric which includes the step of cementing one to the other of opposed flexible fabric sheets at defined spaced points to form enclosed pockets therebetween by means of an adhesive, and injecting under air pressure a thread filler into the space between the points where the opposed sheets are adhered one to the other.

4. The method of making an embossed fabric which includes the steps of cementing opposed flexible fabric sheets one to the other at spaced points therebetween by means of an application of an adhesive to define enclosed pockets between said sheet, and injecting under air pressure a soft filler thread through one of the sheets into the defined pockets to expand the opposed sheets between the adhered points.

5. The method of making an embossed stitchless fabric consisting in applying an adhesive in a line along the outline of a pattern on the back side of a flexible fabric sheet to delineate with the adhesive areas forming enclosed pockets conforming to said pattern when a backing sheet is adhered to said fabric sheet, adhering a flexible backing sheet to the back of said fabric sheet along the line defined by the adhesive to produce such enclosed pockets by imposing a backing sheet on said fabric sheet over the adhesive and impressing the sheets into intimate contact with each other on opposite sides of the adhesive, then injecting under air pressure through one of the sheets into the pockets a filler of soft material in the form of a thread to expand the opposed sheets between the adhered lines defining the pockets.

GAETANO CORALLO.

REFERENCES CITED

The following references are of record in the file of this patent:

UNITED STATES PATENTS

| Number | Name | Date |
| --- | --- | --- |
| 70,640 | Soutrenon | Nov. 5, 1867 |
| 255,437 | Leissner | Mar. 28, 1882 |
| 334,300 | Sochefsky | Jan. 12, 1886 |
| 683,784 | McCulloch | Oct. 1, 1901 |
| 768,055 | Leisel | Aug. 23, 1904 |
| 1,194,242 | Schonlau | Aug. 8, 1916 |
| 1,375,857 | Olney | Apr. 26, 1921 |
| 2,284,727 | Cunnington | June 2, 1942 |
| 2,338,490 | Cunnington | Jan. 4, 1944 |
| 2,482,823 | Adams | Sept. 27, 1949 |